G. G. FRELINGHUYSEN.
METAL WORKING MACHINE.
APPLICATION FILED MAY 25, 1915.

1,241,265.

Patented Sept. 25, 1917.
5 SHEETS—SHEET 2.

WITNESSES

INVENTOR
G. G. Frelinghuysen
BY
John D. Morgan
ATTORNEYS

G. G. FRELINGHUYSEN.
METAL WORKING MACHINE.
APPLICATION FILED MAY 25, 1915.
1,241,265.
Patented Sept. 25, 1917.
5 SHEETS—SHEET 3.
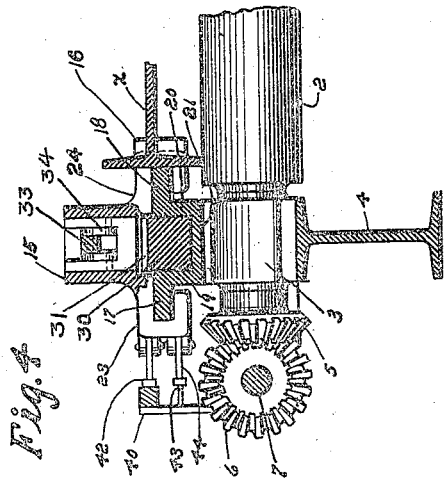
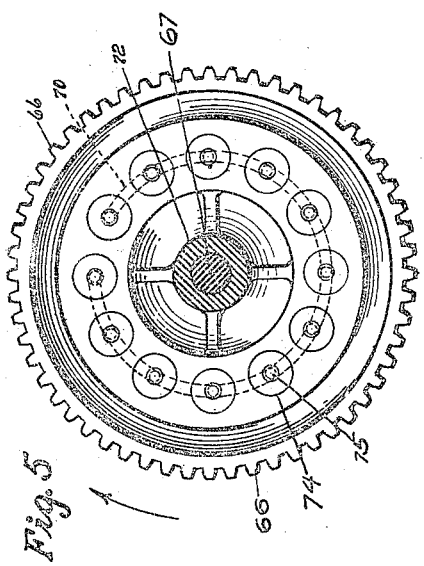
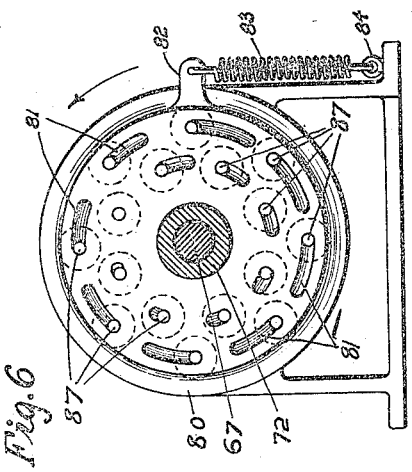
WITNESSES
INVENTOR
G. G. Frelinghuysen
BY
John D. Morgan
ATTORNEYS

G. G. FRELINGHUYSEN.
METAL WORKING MACHINE.
APPLICATION FILED MAY 25, 1915.

1,241,265.

Patented Sept. 25, 1917.
5 SHEETS—SHEET 5.

WITNESSES

INVENTOR
G. G. Frelinghuysen
BY
John D. Morgan
ATTORNEYS

UNITED STATES PATENT OFFICE.

GEORGE G. FRELINGHUYSEN, OF MORRIS COUNTY, NEW JERSEY, ASSIGNOR TO STEEL UTILITIES, INCORPORATED, A CORPORATION OF NEW YORK.

METAL-WORKING MACHINE.

1,241,265.        Specification of Letters Patent.     Patented Sept. 25, 1917.

Application filed May 25, 1915. Serial No. 30,277.

*To all whom it may concern:*

Be it known that I, GEORGE G. FRELINGHUYSEN, a citizen of the United States, and a resident of Morris county, in the State of New Jersey, have invented new and useful Improvements in Metal-Working Machines, of which the following is a specification.

The invention relates to metal working machines, and more especially to machines in which structural shapes, or like heavy work, are successively traveled and accurately stopped to be punched for rivet holes or like operations, the machine being especially adapted for use in the fabrication of structural shapes. Other objects and advantages of the invention will be set forth hereinafter in part, and in part will be obvious herefrom.

The invention consists in the novel parts, arrangements, constructions and improvements herein shown and described.

The accompanying drawings, referred to herein and constituting a part hereof, illustrate an embodiment of my invention, and together with the description serve to explain the principles thereof.

Of the drawings:—

Fig. 3 is a longitudinal and vertical fragmentary section, on an enlarged scale, substantially on the line A—B of Fig. 1;

Fig. 4 is a transverse vertical section, on an enlarged scale, substantially on the line C—D of Fig. 1;

Fig. 5 is a vertical section, on an enlarged scale, taken on the line E—F of Fig. 2;

Fig. 6 is a vertical section, on an enlarged scale, on the line G—H of Fig. 2;

Figure 1:
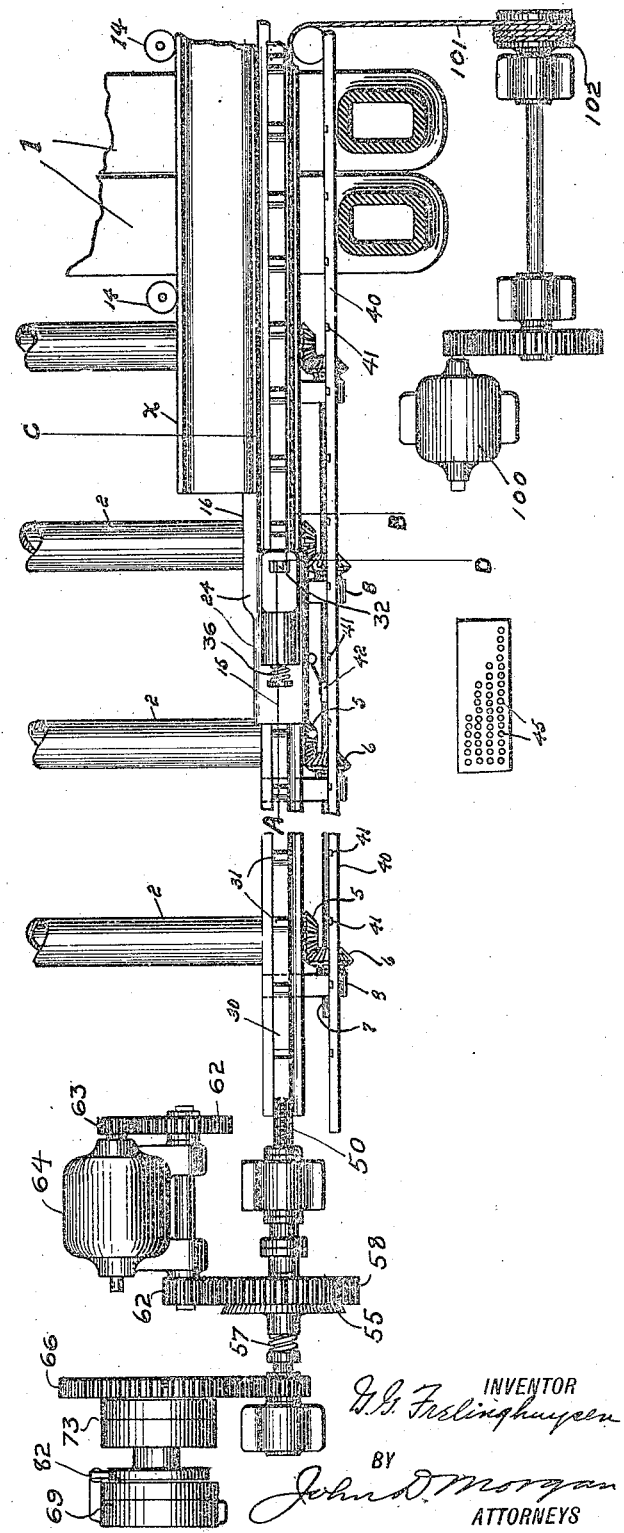
Figure 1 is a fragmentary top plan of a machine constructed in accordance with the principles of the invention.

In the exemplified embodiment illustrated by way of example in the accompanying drawings, the structural shape $x$ is traveled and stopped successively along a horizontal pathway extending past the tool-equipped means, such as a punch or punches, the general position of the punching mechanism being indicated by a housing 1. The invention, in accordance with certain of its features, is applied to a machine in which the shape is traveled along its horizontal pathway past the punch, and in which a head or like member engages the shape, preferably at its forward end, to successively permit and prevent the travel of the shape in accordance with successive settings of the distance determining devices (such as a keyboard or a distance record sheet) for different desired or predetermined distances of travel of the shape, to properly position or space the rivet holes in the shape.

In the embodied form, the shape $x$ rests upon a series of driven rolls 2, arranged in longitudinal series at either side of the punching mechanism or mechanisms. The rolls 2 are journaled in suitable bearings 3, mounted upon the frame 4. Fixed upon the shafts of the rollers 2 are beveled gears 5, intermeshing with beveled gears 6, which gears 6 are fixed on a shaft 7, which shaft extends along the frame 4 and is rotatably supported in bearings 8 upon the machine frame. The shaft 7 is rotated in a suitable manner, as by a motor (not shown). The shape $x$, resting upon the rolls 2, is thus propelled longitudinally along by the rolls 2. The rolls 2, may be continuously rotated, but are preferably started and stopped and accelerated and retarded, so as to provide the most advantageous manner of starting, traveling and stopping the heavy shapes. Alining rolls 14, or other suitable devices may be employed to keep the shape $x$ transversely alined in its path, or alining rolls may be used on one side to aline the shape against the guideway flange 18, if desired.

The embodied form of means for permitting and preventing the travel of the shape in accordance with the setting of the settable distance determining devices comprises a head 15, having a part 16 extending in front of the shape $x$, so that as the shape is impelled forward by the rolls 2, its forward end is kept in contact with the face of the member 16. The head 15, is constructed and arranged to travel along a guideway, extending along side and parallel with the pathway of the shape. Said guideway comprises horizontally extending flanges 17 and 18, extending outwardly from a channeled body, said body having side walls 19 and 20 and a bottom 21. The guideway is supported upon pillars 22 carried upon the machine frame 4. To accurately guide the head 15 along the guideway, said head is provided with outwardly extending portions 23 and 24, which portions are formed to fit closely about the extensions 17 and 18 of the guideway as best appears from Fig. 4. The head 15 thus travels easily along the guideway, and will accurately stop the shape without any play or lost motion.

Coöperating with the traveling head 15, and comprising a part of the distance determining means, is a member, preferably in the form of a bar or rail, extending along the path of travel of the shape and provided with engaging devices spaced therealong at regular distance units or intervals. The head 15 has means which at the proper time or distance engage with the engaging devices upon said member, thereby to bring the head 15, and thus the shape $x$, to rest in accordance with a setting of the distance determining means. In certain aspects of the invention such longitudinally arranged engaging member may be permanently fixed or stationary, but in accordance with certain features of the invention said member or bar is normally stationary, but is longitudinally movable at or about the time that the engaging devices between said member and the head 15 pass into engaging relation to effect a distance setting or positioning of the beam.

The selective engagement of the head 15, with the desired lug or engaging means on the bar 30 in its normally stationary position in the machine may be utilized to effect or secure the major distance denomination or value in a particular setting or reading, and the longitudinal movement of the bar may effect or secure the minor distance denominations or values.

In the embodied form, the engaging means upon the head 15 operates in timed relation to engage with a particular engaging device of the series of such devices upon the longitudinal member or bar, to stop the shape $x$ at the number of feet in the particular distance setting, the bar 30 being then longitudinally movable by, or under the control of, suitable mechanism to effectuate the inches and fractions-of-an-inch of the distance setting, the head 15 and therewith the shape $x$ being brought to rest accurately at the correct number of feet, inches and fractions-of-an-inch corresponding to the distance setting or reading. The longitudinally extending bar 30 is preferably supported within the guideway for the head 15, and said bar is shown of rectangular form resting upon the bottom 21 of the guideway and fitting closely between the vertical walls 19 and 20 thereof. The bar 30 is provided with a series of upwardly extending lugs 31, arranged therealong at fixed or predetermined distances apart, and preferably at intervals of one foot, that is, the face of each of the lugs 31 that engages with the latch or other engaging means on the head 15 are exact distance units apart, such as one foot.

In the embodied form of engaging means carried by the head 15 to engage with the selected lug 31 upon the bar 30 (which lug corresponds to the number of feet in the particular distance setting), there is included a latch 32 working with close fit in an aperture or guideway in the head 15. Also slidable in an aperture or guideway in the head 15 is a sliding member or latch 33. A pivoted link 34 connects the latch 32 and the slide 33, so that as the slide 33 is moved to the right in Fig. 3, the latch 32 is projected into the path of the next succeeding lug 31, and when the slide 33 is moved to the left in Fig. 3, the latch 32 is retracted from engaging position with respect to the lugs 31.

The actuating means for the latch 32, as embodied, comprises a solenoid 35 carried in the head 15, the core 36 thereof being held in decentered position by a spring 37, said spring acting between the head 38 of the core 36 and the end of the solenoid 35. The spring 37 thus holds the latch 32 in retracted position. The solenoid 35 is energized from or in accordance with the settable devices which are set for the desired distance, in timed relation as the head 15 travels along so as to project the latch 32 into engaging position with respect to the proper lug 31.

The embodied form of said energizing means comprises a bar 40 extending alongside the path of travel of the head 15, the bar 40 carrying contact pieces 41, arranged at distance units apart, in the present case one foot apart. The contact pieces 41 are connected to a keyboard or like settable means so that they may be selectively energized to correspond to the distance setting or reading desired. That is, if a particular distance of travel for the shape is eight feet, the particular contact piece 41 corresponding to eight feet will be alive while the others are dead. The head 15 is provided with a detector or trolley device 42 having a shoe which travels along the side face of the bar 40 and along the various contacts 41 to complete the circuit when the live contact 41 is reached. A suitable return circuit is provided, the embodied form thereof comprising a return wire or rod 43, which rod extends alongside the bar 40. Along the rod 43 a trolley or shoe 44 travels, said shoe being supported from the head 15 and traveling therewith.

Both the trolleys 42 and 44 are in circuit with the solenoid 35.

The settable devices may be either a keyboard, or the contacts for a distance record sheet, and are indicated herein by reference numeral 45. It will be understood that the closing of any circuit at 45 corresponding to a given number of feet will energize the corresponding contact 41. As the head 15 travels along its guideway, the shoe of the trolley 42 will pass successively over the successive contact points 41, and when the live contact 41 is engaged by the shoe, the circuit is closed, the solenoid 35 is energized, the core 36 is centered against its spring 37, and the latch 32 is projected into position to engage the next succeeding lug 31 upon the bar 30. The latch 32 will be held in such projected or engaging position so long as the shoe 42 is in engagement with the live contact 41.

In accordance with certain features of the invention, and as hereinbefore stated, additional travel (in the present instance for inches and sixteenths-of-an-inch) are given to the work by causing longitudinal movement of the bar 30 preferably after engagement of the head 15 with the bar 30 or preferably after the projection of the latch 32 into engaging position with respect to the selected lug 31. In the embodied form of such means, the bar 30 moves longitudinally in the guideway (as shown in Fig. 4). The bar 30 has fixed to the end thereof a screw threaded extension or rod 50, said screw threaded rod 50 engaging an internally threaded sleeve 51, which sleeve is rotatably supported in a journal bearing 52. Fixed to the screw threaded sleeve 51 to rotate therewith is a shaft 53, the other end of said shaft being supported in a journal bearing 54. Fixed to rotate with, but movable along, shaft 53 is a friction clutch member 55, which is frictionally pressed, by means of a spring 57, against a coöperating clutch member 56, mounted loosely upon the shaft 53. The clutch member 56 has upon its periphery gear teeth 58 which gear teeth mesh with a pinion 60, which pinion is carried upon a shaft 61. Fixed to said shaft 61 is a gear 62, meshing with a pinion 63 upon the shaft of a motor 64.

Fixed upon the shaft 57 to rotate therewith is a pinion 65, said pinion meshing with a gear wheel 66, mounted upon a shaft 67. The shaft 67, is rotatably supported in a journal 68, and at its other end is supported in a frame member 69, later to be described. Coöperating with gear wheel 66 is a stop mechanism operating proportionately to the setting for inches and sixteenths. As embodied there is formed in the gear wheel 66 an arcuate slot 70 of such dimension as to permit rotation of the gear 66 equal or proportional to a longitudinal travel of the bar 30 of eleven inches. Rotatably mounted on shaft 67 is a sleeve 72 and fixed thereto, or integral therewith, is a cylindrical head 73.

Figure 2:
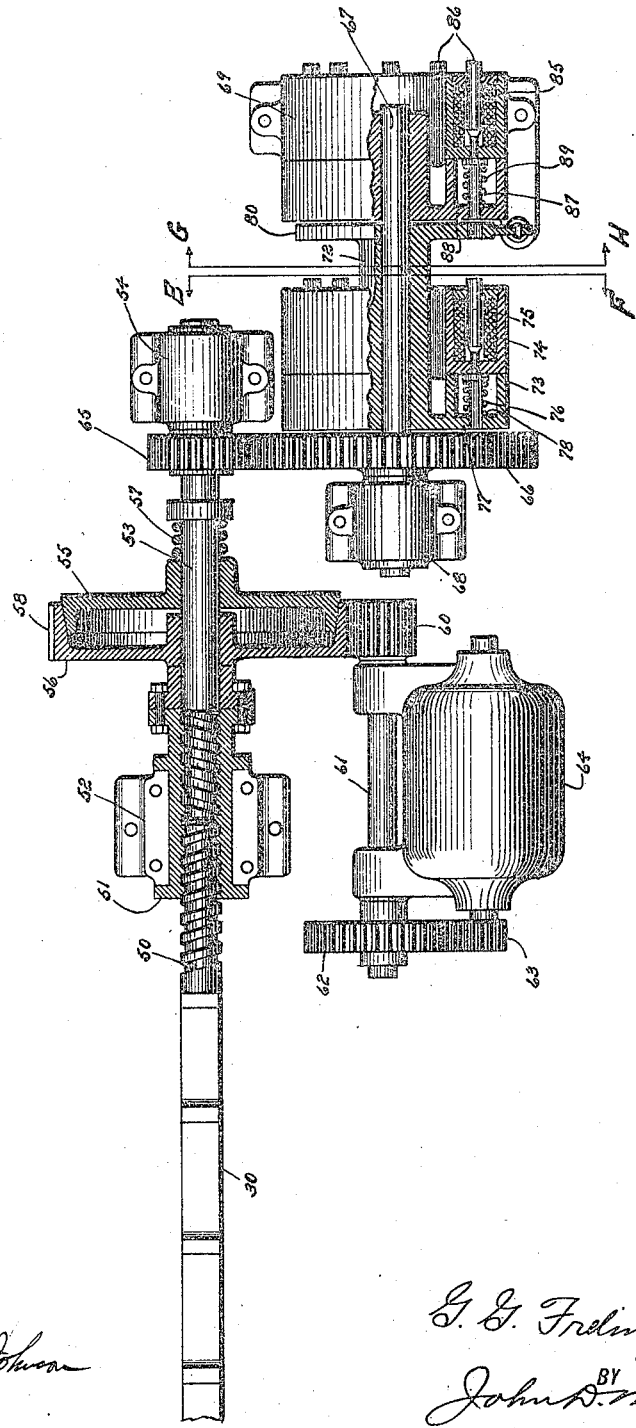
Fig. 2 is a fragmentary top plan on an enlarged scale, with parts in section and parts broken away, of the mechanism at the left hand end of Fig. 1.

In the head 73 is carried an annular series of solenoids 74 spaced apart to correspond to inches of longitudinal travel or movement of the bar 30. Connected to the cores 75 of these solenoids, respectively, are pins 76 reciprocable in apertures in the circular end 77 of the cylindrical member 73. The cores 75 of the solenoids are held in decentered position by springs 78, which springs likewise hold the pins 76 in retracted position. When a particular solenoid is energized to correspond to a distance reading or setting, its core 75 is centered and thereby its pin 76 is projected from the plate 77 into the arcuate slot 70 formed in the gear wheel 66. Fixed to or integral with the other end of the sleeve 72 (at the right in Fig. 2) is a disk 80, in which is formed a series of arcuate slots 81. Extending from the disk 80 is a lug 82, to which is connected a spiral spring 83, which spring is also connected to the frame at 84.

Facing the plate 80 is the frame member 69, hereinbefore referred to, and mounted in the frame member 69 are one or more annular series of solenoids 85. To the respective cores 86 of these solenoids are attached pins 87, working in apertures in the face 88 of the frame piece 69. The pins 87 are held retracted, and the solenoid cores 86 thereby decentered, by springs 89. When any particular solenoid 85, corresponding to a desired sixteenth-of-an-inch is energized, its core 86 centers against the action of the spring 89, and its pin 87 is projected into the corresponding slot 81 in the head 80.

It will be understood that the cylindrical head 73 is rotatable, but is held to an initial position by spring 83 holding the lug 82 against one of the pins 87, which is normally projected, or otherwise suitably connected or arranged, to act as an initial or as a zero point. One of the pins 76 may also be projected or otherwise suitably connected or arranged to act as a stop at an initial or at a zero point for the gear wheel 66.

After a distance setting has been made, the head 15 will be pushed along by the beam $x$, as the beam is propelled by the rotating rolls 2, the shoe of the trolley 42 sliding over the successive contacts 41 representing feet of travel of the shape $x$ past the punching mechanism. When the trolley shoe 42 meets the live contact 41 corresponding to the number of feet of a distance reading, which may be an over-all reading from the end of the beam, the latch 32 is projected into the path of the next occurring lug 31 upon the bar 30. If there is an inch and a sixteenths reading in the desired distance setting, there is projected in each of said series of pins, respectively, a pin corresponding to the number of inches and the number of sixteenths of the particular distance reading or setting being made, and the motor 64, through the clutch 55, 56 rotates the shaft 53 to an extent corresponding to the setting of the pins 76 and 87. As the shaft 53 rotates, the sleeve 51 rotates therewith, and the bar 30 is moved longitudinally the number of inches and sixteenths-of-an-inch for which the setting was made. The gear wheel 66 rotates until the end of the slot 70 of the gear wheel, or like stop, engages the set pin 76. Thereafter, there is further rotation of the gear wheel and of the cylindrical head 73 together until the set pin 87 engages the end of the corresponding slot in the plate 80, when the shaft 53 and therewith the bar 30 are brought to rest accurately at the desired distance in inches and sixteenths-of-an-inch. A new setting on a keyboard, or the feeding forward of a distance record sheet restores the previously set pins in a well known manner.

Figure 7:
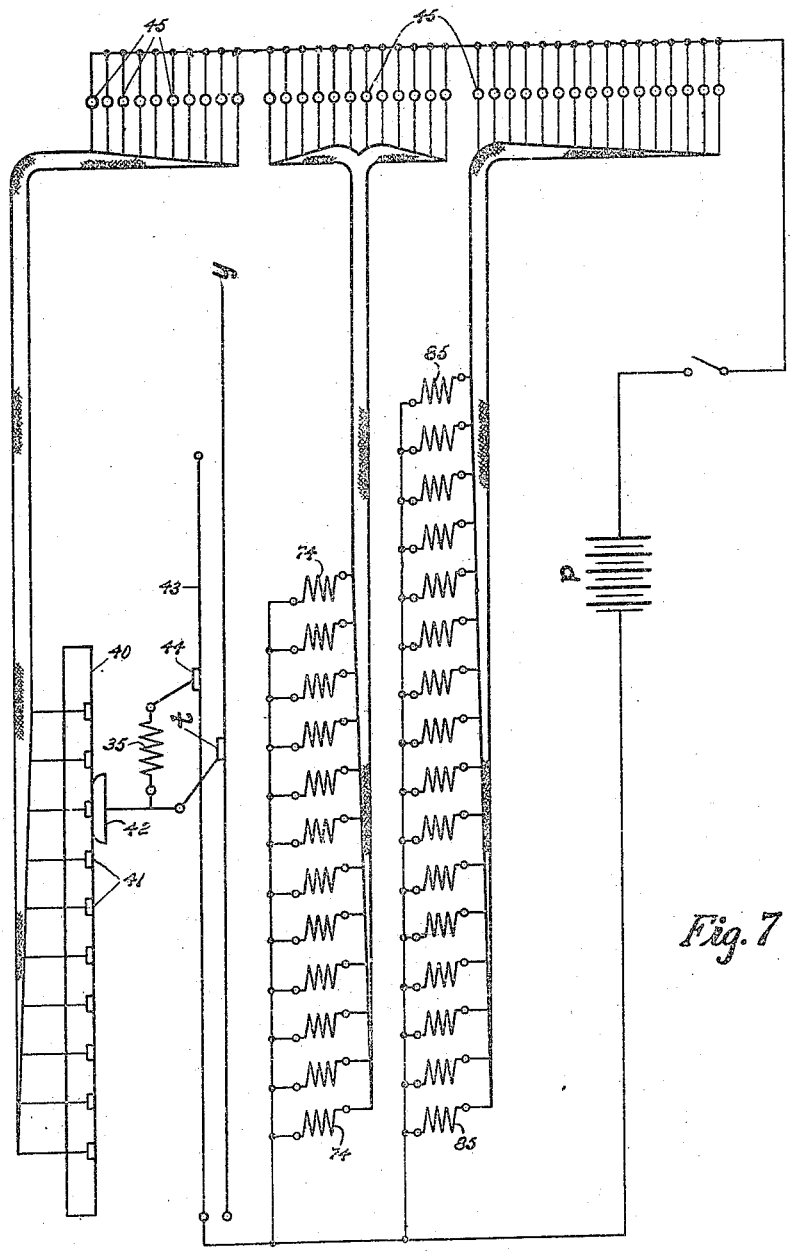
Fig. 7 is a diagram of a system of wiring from a keyboard or a set of distance record controlled contacts to the distance determining devices.
Figure 8:
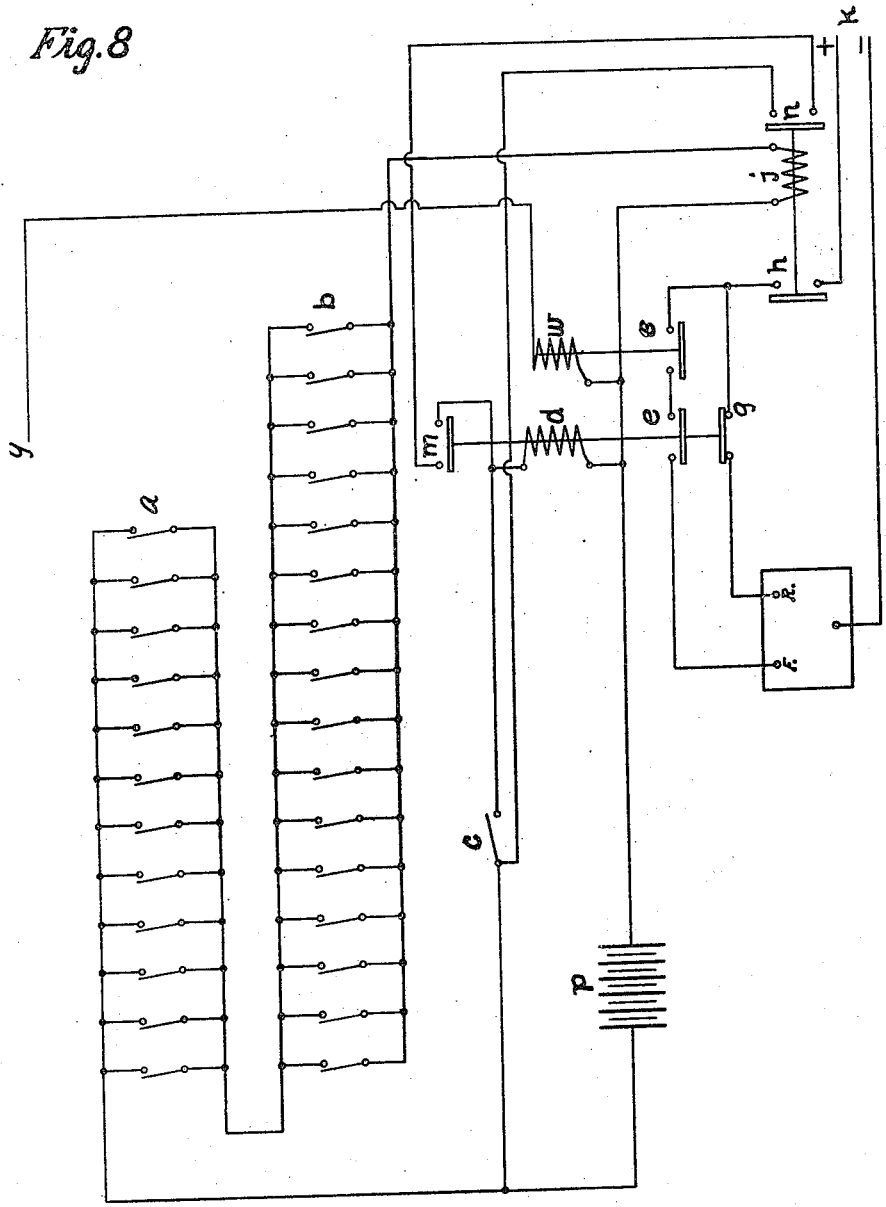
Fig. 8 is a diagram of a system of wiring and coöperating devices for controlling the motor which moves the work positioning bar.

Referring to the wiring diagram of Fig. 8, $a$ represents a series of contacts or switches which correspond to inches and these contacts are made or closed by the setting of the corresponding stop pins of the series 74, 75 (Figs. 1, 4 and 7). There is a like series of contacts or switches $b$ for the sixteenths-of-an-inch, likewise made or closed by the corresponding stop pins of the series 85, 86 (Figs. 1, 4 and 7) and likewise opened when their pins are restored.

At $c$ is a switch or contact, which may be regarded as a stop contact, and which is closed when the gear 66 and plate 80 and coöperating devices are at the restored or initial position. Two oppositely acting switches $e$ and $g$ are provided in the circuit for the motor controller, one being in the forward circuit and the other in the reverse circuit, to govern or determine the direction of the motor drive. The switches $e$ and $g$ are reversely or oppositely opened and closed by a solenoid $d$. At $h$ is a switch controlling both circuits to the motor controller, which switch is controlled by a solenoid $j$, and $k$ represents the lines to any source of power. At $m$ and $n$ are reversely operating interlocking switches making a holding circuit for the solenoid $d$. A source of current for the solenoid circuits is shown at $p$. At F. and R. are indicated the connections to the motor controller for forward and reverse running.

At $s$ is shown a switch in the motor circuit, which switch is controlled by solenoid $w$. The wire $y$ is in the circuit for solenoid $w$, and it also extends along the path of travel of the work. A trolley $t$ is mounted on head 15 and runs along the wire $y$.

Considering the machine as at the end of its cycle of operation a new setting is made. Current from $p$ flows through closed contact $a$ and through closed contact $b$ to solenoids $j$ thereby closing switch $h$. Current from the line $k$ flows through the switch $h$ and through switch $g$ to R, in the motor controller, and the motor 64 reverses, driving the mechanism back to the initial position for the new setting.

At or coincident with the initial position, contact $c$ closes, and current from $p$ flows through contact $c$ and solenoid $d$, thereby opening switch $g$ and closing switch $e$, and thereby closing the circuit F on the motor controller and the motor starts forward. As the machine goes ahead, contact $c$ opens but interlock $m$ having closed, current from $p$ goes through interlock $n$ and interlock $m$ to solenoid $d$, holding switch $e$ closed for forward running until the reading is completed, when the stop pins are released. Contacts $a$ and $b$ open and allow switches $h$ and $e$ to open, thereby stopping the motor and leaving the mechanism in initial position, to repeat the cycle on the next setting. When the head 15 advances to a point where trolley shoe 42 meets the live segment 41, solenoid 35 is energized, the latch 32 sets, and current is also delivered through the trolley $t$ to line $y$, energizing solenoid $w$, closing the switch $s$ in the line of the motor controller for forward running. Motor 100 winds cord 101 on drum 102 to return head 15 for a new beam.

The invention in its broader aspects is not limited to the precise form of mechanism shown and described, nor to any precise form, but changes may be made therein within the scope of the accompanying claims, without departing from the principles of the invention and without sacrificing its chief advantages.

What I claim as my invention and desire to secure by Letters Patent is:—

1. A machine for punching structural shapes including in combination, punching mechanism, and means for traveling and stopping a shape relative to said punching mechanism, said means comprising an engaging device traveling with the shape, a stationary device with which the traveling device engages, and means for imparting longitudinal movement to both said devices while in engagement to complete the traveling and positioning of the shape relatively to the punching mechanism.

2. A machine for punching structural shapes including in combination, punching mechanism, and means for traveling and stopping a shape relative to said punching mechanism, said means comprising an engaging device traveling with the shape, a stationary member arranged along the path of travel of the shape and having a plurality of spaced devices with which the traveling device may engage, and means for imparting measured movement to said stationary member after such engagement to complete the travel and positioning of the shape relatively to the punching mechanism.

3. A machine for punching structural shapes including in combination, punching mechanism, and means for traveling and stopping a shape relative to said punching mechanism, said means comprising a head with which the forward end of the shape engages, a plurality of engaging devices along the path of the shape, a device carried by said head and movable to selectively engage a desired one of said plurality of engaging devices, and means for moving said devices together after they have engaged, to complete a distance setting.

4. A machine for punching structural shapes including in combination, punching mechanism, and means for traveling and stopping a shape relative to said punching mechanism, said means comprising a guideway, a head traveling along said guideway and in fixed relation to the shape, a plurality of engaging devices along the path of the shape, a device carried by said head and movable to selectively engage a desired one of said plurality of engaging devices, and means for moving said devices together after they have engaged, to complete a distance setting.

5. A machine for punching structural shapes including in combination, punching mechanism, and means for traveling and stopping a shape relative to said punching mechanism, said means imparting endwise travel to the shape, and means for stopping the travel of the shape, said stopping means comprising an engaging device traveling with the shape, a series of stationary devices arranged along the path of travel of the shape with which the traveling engaging device is adapted to selectively engage, and means for traveling said devices after they have engaged to complete a distance setting.

6. A machine for punching structural shapes including in combination, punching mechanism, and means for traveling and stopping a shape relative to said punching mechanism, said means imparting endwise travel to the shape, and means for stopping the travel of the shape, said stopping means comprising a head traveling with the shape, an engaging device carried by said head, a series of stationary devices arranged along the path of travel of the shape with which the traveling engaging device is adapted to selectively engage, and means for traveling said devices after they have engaged to complete a distance setting.

7. A machine for punching structural shapes including in combination, punching mechanism, and means for traveling and stopping a shape relative to said punching mechanism, said means imparting endwise travel to the shape, and means for stopping the travel of the shape, said stopping means comprising a guideway along the path of travel of the shape, a head engaging the shape and traveling along said guideway, an engaging device carried by said head, a series of stationary devices arranged along the path of travel of the shape with which the traveling engaging device is adapted to selectively engage, and means for traveling said devices after they have engaged to complete a distance setting.

8. A machine for punching structural shapes including in combination punching mechanism, and means for traveling and stopping a shape relative to said punching mechanism, said means comprising an engaging device traveling with the shape, a stationary device, means for causing the traveling device to engage therewith in timed relation, and means for imparting longitudinal movement to both said devices while in engagement to complete the traveling and positioning of the shape relatively to the punching mechanism.

9. A machine for punching structural shapes including in combination, punching mechanism, and means for traveling and stopping a shape relative to said punching mechanism, said means comprising an engaging device traveling with the shape, a stationary device with which the traveling device engages in timed relation, settable means for controlling said timed relation, and means for imparting longitudinal movement to both said devices while in engagement to complete the traveling and positioning of the shape relatively to the punching mechanism.

10. A machine for punching structural shapes including in combination, punching mechanism, and means for traveling and stopping a shape relative to said punching mechanism, said means comprising an engaging device traveling with the shape, a stationary device with which the traveling device engages in timed relation, settable means for controlling said timed relation, and means for imparting longitudinal movement to both said devices while in engagement to complete the traveling and positioning of the shape relatively to the punching mechanism, said last mentioned means being controlled by said settable means.

11. A machine for punching structural shapes including in combination, punching mechanism, and means for traveling and stopping a shape relative to said punching mechanism, said means comprising an engaging device traveling with the shape, a stationary member arranged along the path of travel of the shape and having a plurality of spaced devices with which the traveling device may engage in timed relation, and means for imparting measured movement to said stationary member after such engagement to complete the travel and positioning of the shape relatively to the punching mechanism.

12. A machine for punching structural shapes including in combination, punching mechanism, and means for traveling and stopping a shape relative to said punching mechanism, said means comprising an engaging device traveling with the shape, a stationary member arranged along the path of travel of the shape, and having a plurality of spaced devices with which the traveling device may engage in timed relation, settable devices controlling said timed relation, and means for imparting measured movement to said stationary member after such engagement to complete the travel and positioning of the shape relatively to the punching mechanism.

13. A machine for punching structural shapes including in combination, punching mechanism, and means for traveling and stopping a shape relative to said punching mechanism, said means comprising a head with which the forward end of the shape engages, a plurality of engaging devices along the path of the shape, a device carried by said head and movable in timed relation to selectively engage a desired one of said plurality of engaging devices, and means for moving said devices together after they have engaged, to complete a distance setting.

14. A machine for punching structural shapes including in combination, punching mechanism, means for traveling and stopping a shape relative to said punching mechanism, said means comprising a head with which the forward end of the shape engages, a plurality of engaging devices along the path of the shape, a device carried by said head and movable in timed relation to selectively engage a desired one of said plurality of engaging devices, settable devices controlling said timed relation, and means for moving said devices together after they have engaged, to complete a distance setting.

15. A machine for punching structural shapes including in combination, punching mechanism, and means for traveling and stopping a shape relative to said punching mechanism, said means comprising a head with which the forward end of the shape engages, a plurality of engaging devices along the path of the shape, a device carried by said head and movable in timed relation to selectively engage a desired one of said plurality of engaging devices, settable devices controlling said timed relation, and means for moving said devices together after they have engaged, to complete a distance setting, said last mentioned means being controlled by said settable means.

16. A machine for punching structural shapes including in combination, punching mechanism, means for traveling and stopping a shape relative to said punching mechanism, said means comprising a guideway, a head traveling along said guideway and in fixed relation to the shape, a plurality of engaging devices along the path of the shape, a device carried by said head and movable in timed relation to selectively engage a desired one of said plurality of engaging devices, settable devices controlling said timed relation, and means for moving said devices together after they have engaged, to complete a distance setting, said last mentioned means being controlled by said settable means.

17. A machine for punching structural shapes including in combination, punching mechanism, means for traveling and stopping a shape relative to said punching mechanism, said means comprising a guideway, a head traveling along said guideway and engaged and propelled by the forward end of the shape, a plurality of engaging devices along the path of the shape, a device carried by said head and movable in timed relation to selectively engage a desired one of said plurality of engaging devices, and means for moving said devices together after they have engaged, to complete a distance setting.

18. A machine for punching structural shapes including in combination, punching mechanism, means for traveling and stopping a shape relative to said punching mechanism, said means comprising a guideway, a head traveling along said guideway and engaged and propelled by the forward end of the shape, a plurality of engaging devices along the path of the shape, a device carried by said head and movable in timed relation to selectively engage a desired one of said plurality of engaging devices, settable devices controlling said timed relation, means for moving said devices together after they have engaged, to complete a distance setting, said last mentioned means being controlled by said settable means.

19. A machine for punching structural shapes including in combination, punching mechanism, means for traveling and stopping a shape relative to said punching mechanism, said means imparting endwise travel to the shape, means for stopping the travel of the shape, said stopping means comprising a guideway along the path of travel of the shape, a head engaging the shape and traveling along said guideway, an engaging device carried by said head, a series of stationary devices arranged along the path of travel of the shape with which the traveling engaging device is adapted to selectively engage in timed relation, settable means controlling said timed relation, and means for traveling said devices after they have engaged to complete a distance setting, said last mentioned means being controlled by said settable means.

20. A machine for punching structural shapes including in combination, punching mechanism, means for traveling a shape relative to said punching mechanism, said means imparting endwise travel to the shape, means for stopping the travel of the shape, said stopping means comprising a guideway along the path of travel of the shape, a head traveling along said guideway and engaged by the forward end of the traveling shape, an engaging device carried by said head, a series of stationary devices arranged along the path of travel of the shape with which the traveling engaging device is adapted to selectively engage in timed relation, settable means controlling said timed relation, and means for traveling said devices after they have engaged, to complete a distance setting.

21. A machine for punching structural shapes including in combination, punching mechanism, means for traveling a shape relative to said punching mechanism, said means imparting endwise travel to the shape, and means for stopping the travel of the shape, said stopping means comprising a guideway along the path of travel of the shape, a head traveling along said guideway and engaged by the forward end of the traveling shape, an engaging device carried by said head, a series of stationary devices arranged along the path of travel of the shape with which the traveling engaging device is adapted to selectively engage in timed relation, settable means controlling said timed relation, and means for traveling said devices after they have engaged, to complete a distance setting, said last mentioned means being controlled by said settable means.

22. A machine for punching structural shapes including in combination, punching mechanism, means for traveling and stopping a shape relative to said punching mechanism, said means comprising an engaging device traveling with the shape, a stationary device with which the traveling device engages, settable means controlling said engagement, and rotary means for imparting longitudinal movement to both said devices while in engagement to complete the traveling and positioning of the shape relatively to the punching mechanism.

23. A machine for punching structural shapes including in combination, punching mechanism, means for traveling and stopping a shape relative to said punching mechanism, said means comprising a guideway, a head traveling along said guideway, and in fixed relation to the shape, a plurality of engaging devices along the path of the shape, a device carried by said head and movable to selectively engage a desired one of said plurality of engaging devices, settable means controlling said engagement, and rotary means controlled by said settable means for moving said devices together after they have engaged, to complete a distance setting.

24. A machine for punching structural shapes including in combination, punching mechanism, means for traveling a shape relative to said punching mechanism, said means imparting endwise travel of the shape, means for stopping the travel of the shape, said stopping means comprising a loosely slidable head propelled by the shape, an engaging device carried by said head, a series of stationary devices arranged along the path of travel of the shape with which the traveling engaging device is adapted to selectively engage, settable means controlling said engagement, and means for traveling said devices after they have engaged to complete a distance setting.

25. A machine for punching structural shapes including in combination, punching mechanism, means for traveling and stopping a shape relative to said punching mechanism, said means imparting endwise travel to the shape, means for stopping the travel of the shape, said stopping means comprising a head traveling with the shape, an engaging device carried by said head, a series of stationary devices arranged along the path of travel of the shape with which the traveling engaging device is adapted to selectively engage, settable means controlling said engagement, and rotatable means for longitudinally traveling said devices after they have engaged to complete a distance setting, said last mentioned means being controlled by said settable means.

26. A machine for punching structural shapes including in combination, punching mechanism, means for traveling and stopping a shape relative to said punching mechanism, said means comprising an engaging device traveling with the shape, a stationary device with which the traveling device engages, and means for imparting movement to both said devices while in engagement to complete the traveling and positioning of the shape relatively to the punching mechanism and a set of electrical contacts automatically controlling the engagement of said engaging means.

27. A machine for punching structural shapes including in combination, punching mechanism, means for traveling and stopping a shape relative to said punching mechanism, said means comprising an engaging device traveling with the shape, a stationary device with which the traveling device engages, and means for imparting movement to both said devices while in engagement to complete the traveling and positioning of the shape relatively to the punching mechanism and a set of electrical contacts controlling the engagement of said engaging means and the movement together of said means after they are engaged.

28. A machine for punching structural shapes including in combination, punching mechanism, means for traveling and stopping a shape relative to said punching mechanism, said means comprising an electrically operated engaging device traveling with the shape, a stationary member arranged along the path of travel of the shape and having a plurality of spaced devices with which the traveling device may engage, means for imparting measured movement to said stationary member after such engagement to complete the travel and positioning of the shape relatively to the punching mechanism and a set of electrical contacts arranged at distance unit spaces along the path of travel of the shape and automatically controlling the engagement of said engaging means.

29. A machine for punching structural shapes including in combination, punching mechanism, means for traveling and stopping a shape relative to said punching mechanism, said means comprising an engaging device traveling with the shape, a stationary member arranged along the path of travel of the shape and having a plurality of spaced devices with which the traveling device may engage, means for imparting measured movement to said stationary member after such engagement to complete the travel and positioning of the shape relatively to the punching mechanism, a set of electrical contacts controlling the engagement of said engaging means and the movement together of said means after they are engaged and a distance record sheet controlling said electrical contacts.

30. A machine for punching structural shapes including in combination, punching mechanism, means for traveling and stopping a shape relative to said punching mechanism, said means comprising a head with which the forward end of the shape engages, a plurality of engaging devices along the path of the shape, an electrically operated device carried by said head and movable to selectively engage a desired one of said plurality of engaging devices, and means for moving said devices together after they have engaged to complete a distance setting, a set of electrical contacts arranged at distance unit intervals along the path of travel of the shape and automatically controlling the engagement of said engaging means, a trolley on said head traveling along the contacts, and a distance record sheet controlling the circuits through the contacts.

31. A machine for punching structural shapes including in combination, punching mechanism, means for traveling and stopping a shape relative to said punching mechanism, said means comprising a head with which the forward end of the shape engages, a plurality of engaging devices along the path of the shape, a device carried by said head and movable to selectively engage a desired one of said plurality of engaging devices, and means for moving said devices together after they have engaged, to complete a distance setting and a set of electrical contacts controlling the engagement of said engaging means and the movement together of said means after they are engaged.

32. A machine for punching structural shapes including in combination, punching mechanism, means for traveling and stopping a shape relative to said punching mechanism, said means comprising an engaging device traveling with the shape, a stationary device with which the traveling device engages, and rotary means for imparting longitudinal movement to both said devices while in engagement to complete the traveling and positioning of the shape relatively to the punching mechanism.

33. A machine for punching structural shapes including in combination, punching mechanism, means for traveling and stopping a shape relative to said punching mechanism, said means comprising an engaging device traveling with the shape, a stationary device with which the traveling device engages, and rotary means having screw-threaded engagement with said stationary device for imparting movement to both said devices while in engagement to complete the traveling and positioning of the shape relatively to the punching mechanism, a set of electrical contacts automatically controlling said rotary means.

34. A machine for punching structural shapes, including in combination, punching mechanism, means for traveling and stopping a shape relative to said punching mechanism, said means comprising an electrically operated engaging device traveling with the shape, a stationary device with which the traveling device engages, and electrically controlled rotary means for imparting longitudinal movement to both said devices while in engagement to complete the traveling and positioning of the shape relatively to the punching mechanism, a set of electrical contacts automatically controlling the engagement of said engaging devices and said rotary means.

35. A machine for punching structural shapes including in combination, punching mechanism, means for traveling and stopping a shape relative to said punching mechanism, said means comprising an engaging device traveling with the shape, a stationary member arranged along the path of travel of the shape and having a plurality of distance unit spaced devices with which the traveling device may engage, and rotary means for imparting measured longitudinal movement to said stationary member after such engagement to complete the travel and positioning of the shape relatively to the punching mechanism.

36. A machine for punching structural shapes including in combination, punching mechanism, means for traveling and stopping a shape relative to said punching mechanism, said means comprising an engaging device traveling with the shape, a stationary member arranged along the path of travel of the shape and having a plurality of spaced devices with which the traveling device may engage, and electrically controlled rotary means including a shaft having screw-threaded engagement with said normally stationary member for imparting measured longitudinal movement to said stationary member after such engagement to complete the travel and positioning of the shape relatively to the punching mechanism, a set of electrical contacts automatically controlling said rotary means.

37. A machine for punching structural shapes including in combination, punching mechanism, means for traveling and stopping a shape relative to said punching mechanism, said means comprising a guideway, a head traveling along said guideway and in fixed relation to the shape, a plurality of engaging devices along the path of the shape, a device carried by said head and movable to selectively engage a desired one of said plurality of engaging devices, and rotary means and connections therefrom to said plurality of engaging devices, including a shaft, for moving said devices together after they have engaged, to complete a distance setting.

38. A machine for punching structural shapes including in combination, punching mechanism, means for traveling and stopping a shape relative to said punching mechanism, said means comprising a guideway, a head traveling along said guideway and in fixed relation to the shape, a plurality of engaging devices along the path of the shape, a device carried by said head and movable to selectively engage a desired one of said plurality of engaging devices, and rotary means including a plurality of stops corresponding to distance values for moving said devices together after they have engaged, to complete a distance setting, a set of electrical contacts automatically controlling said rotary means.

39. A machine for punching structural shapes including in combination, punching mechanism, means for traveling and stopping a shape relative to said punching mechanism, said means comprising a guideway, a head traveling along said guideway and engaged by the forward end of the shape, a plurality of engaging devices along the path of the shape, a device carried by said head and movable to selectively engage a desired one of said plurality of engaging devices, and rotary means including a plurality of spaced projectable pins for moving said devices together after they have engaged, to complete a distance setting.

40. A machine for punching structural shapes including in combination, punching mechanism, means for traveling and stopping a shape relative to said punching mechanism, said means comprising a guideway, a head traveling along said guideway and engaged by the forward end of the shape, a plurality of engaging devices along the path of the shape, a device carried by said head and movable to selectively engage a desired one of said plurality of engaging devices, and rotary means including a plurality of distance value representing, electrically-controlled projectable pins for moving said devices together after they have engaged, to complete a distance setting, a set of electrical contacts automatically controlling said rotary means.

41. A machine for punching structural shapes including in combination, punching mechanism, means for traveling and stopping a shape relative to said punching mechanism, said means imparting endwise travel to the shape, means for stopping the travel of the shape, said stopping means comprising an engaging device traveling with the shape, a series of stationary devices arranged along the path of travel of the shape with which the traveling engaging device is adapted to selectively engage, and rotary means for longitudinally traveling said devices after they have engaged, to complete a distance setting.

42. A machine for punching structural shapes including in combination, punching mechanism, means for traveling and stopping a shape relative to said punching mechanism, said means imparting endwise travel to the shape, means for stopping the travel of the shape, said stopping means comprising an engaging device traveling with the shape, a series of stationary devices arranged along the path of travel of the shape with which the traveling engaging device is adapted to selectively engage, and rotary means including a plurality of settable distance stops for traveling said devices after they have engaged, to complete a distance setting, a set of electrical contacts automatically controlling said rotary means.

43. A machine for punching structural shapes including in combination, punching mechanism, means for traveling the shape and stopping it in position to be punched, said means including an engaging device traveling with the shape, a device adjacent to the path of travel of the shape and engaged by said traveling engaging device and means for imparting translational travel to said devices after their engagement to bring the shape to rest at the desired position with respect to the punching mechanism.

44. A machine for punching structural shapes including in combination, punching mechanism, means for traveling the shape and stopping it in position to be punched, said means including an engaging device traveling with the shape, a device adjacent to the path of travel of the shape and engaged by said traveling engaging device and rotary means for imparting translational travel to said devices after their engagement to bring the shape to rest at the desired position with respect to the punching mechanism.

45. A machine for punching structural shapes including in combination, punching mechanism, means for traveling the shape and stopping it in position to be punched, said means including an engaging device traveling with the shape, a device adjacent to the path of travel of the shape and engaged by said traveling engaging device and settable means for imparting translational travel to said devices after their engagement to bring the shape to rest at the desired position with respect to the punching mechanism.

46. A machine for punching structural shapes including in combination, punching mechanism, means for traveling the shape and stopping it in position to be punched, said means including an engaging device traveling with the shape, a device adjacent to the path of travel of the shape and engaged by said traveling engaging device and rotary, settable means, and means for imparting translational travel to said devices after their engagement to bring the shape to rest at the desired position with respect to the punching mechanism.

47. A machine for punching structural shapes including in combination, punching mechanism, means for traveling the shape and stopping it in position to be punched, said means including an engaging device traveling with the shape, a device adjacent to the path of travel of the shape and engaged by said traveling engaging device and rotary, settable means, and means for imparting translational travel to said devices after their engagement to bring the shape to rest at the desired position with respect to the punching mechanism, said settable means including a plurality of electrical contacts corresponding to distance values.

48. A machine for punching structural shapes including in combination, punching mechanism, means for traveling and stopping a shape relative to said punching mechanism, said means comprising an engaging device traveling with the shape, a stationary device with which the traveling device engages, and means for imparting movement to both said devices while in engagement to complete the traveling and positioning of the shape relatively to the punching mechanism, and means for restoring the normally stationary engaging device to normal position.

49. A machine for punching structural shapes including in combination, punching mechanism, means for traveling and stopping a shape relative to said punching mechanism, said means comprising an engaging device traveling with the shape, a stationary device with which the traveling device engages, and settable, rotary means for imparting movement to both said devices while in engagement to complete the traveling and positioning of the shape relatively to the punching mechanism and means operating automatically for restoring the normally stationary engaging device and the rotary settable means to normal position.

50. A machine for punching structural shapes including in combination, punching mechanism, means for traveling and stopping a shape relative to said punching mechanism, said means comprising an engaging device traveling with the shape, a stationary member arranged along the path of travel of the shape and having a plurality of spaced devices with which the traveling device may engage, means for imparting measured movement to said stationary member after such engagement to complete the travel and positioning of the shape relatively to the punching mechanism and means operating through said last mentioned means for restoring the normally stationary engaging device to normal position.

51. A machine for punching structural shapes including in combination, punching mechanism, means for traveling and stopping a shape relative to said punching mechanism, said means comprising an engaging device traveling with the shape, a stationary member arranged along the path of travel of the shape and having a plurality of spaced devices with which the traveling device may engage, and rotary, settable means having screw-threaded engagement with the normally stationary member for imparting measured movement to said stationary member after such engagement to complete the travel and positioning of the shape relatively to the punching mechanism and means operating through said rotary settable means for restoring the normally stationary engaging device to normal position.

52. A machine for punching structural shapes including in combination, punching mechanism, means for traveling and stopping a shape relative to said punching mechanism, said means comprising a head with which the forward end of the shape engages, a plurality of engaging devices along the path of the shape, a device carried by said head and movable to selectively engage a desired one of said plurality of engaging devices, means for moving said devices together after they have engaged, to complete a distance setting and means for restoring said engaged device to normal position.

53. A machine for punching structural shapes including in combination, punching mechanism, means for traveling the shape and stopping it in position to be punched, said means including an engaging device traveling with the shape, a device adjacent to the path of travel of the shape and engaged by said traveling engaging device and means for imparting translational travel to said devices after their engagement to bring the shape to rest at the desired position with respect to the punching mechanism and means for restoring said rotary means.

54. A machine for punching structural shapes, including in combination, punching mechanism, means for traveling the shape and stopping it in position to be punched, said means including an engaging device traveling with the shape, a device adjacent to the path of travel of the shape and engaged by said traveling engaging device and means for imparting translational travel to said devices after their engagement to bring the shape to rest at the desired position with respect to the punching mechanism and means for restoring both said rotary means and said device adjacent to the path of the shape.

55. A machine for punching structural shapes including in combination, punching mechanism, means for traveling the shape and stopping it in position to be punched, said means including an engaging device traveling with the shape, a device adjacent to the path of travel of the shape and engaged by said traveling engaging device and rotary, settable means for imparting translational travel to said devices after their engagement to bring the shape to rest at the desired position with respect to the punching mechanism and means for restoring said rotary settable means.

56. A machine for punching structural shapes including in combination, punching mechanism, means for traveling the shape and stopping it in position to be punched, said means including an engaging device traveling with the shape, a device adjacent to the path of travel of the shape and engaged by said traveling engaging device and settable means for imparting translational travel to said devices after their engagement to bring the shape to rest at the desired position with respect to the punching mechanism, and means for restoring said settable means.

57. A machine for punching structural shapes including in combination, punching mechanism, means for traveling the shape and stopping it in position to be punched, said means including an engaging device traveling with the shape, a device adjacent to the path of travel of the shape and engaged by said traveling engaging device, means having rotary movement and screw-threaded connection with last-mentioned device for imparting translational travel to said devices after their engagement to bring the shape to rest at the desired position with respect to the punching mechanism and automatically operating means for restoring said rotary means.

58. A machine for punching structural shapes including in combination, punching mechanism, an engaging device traveling with the work, a plurality of devices alongside the path of travel of the work with which said engaging device selectively engages after a selected predetermined distance, and means for traveling the engaged devices after engagement a selected predetermined distance to complete the desired distance reading or setting.

59. A machine for punching structural shapes including in combination, punching mechanism, an engaging device traveling with the work, a plurality of devices alongside the path of travel of the work with which said engaging device selectively engages after a selected predetermined distance, and means for traveling the engaged devices after engagement a selected predetermined distance to complete the desired distance reading or setting, said means including a plurality of engaging devices corresponding to distance units and a plurality of settable devices controlling said distance unit devices.

60. A machine for punching structural shapes including in combination, punching means, devices for effecting a fixed relation between the work and a member having translational travel along the path of the work, a plurality of members corresponding to distance units positionable controlling the extent of joint translational movement of the work and of said member, and settable devices automatically controlling said positionable devices.

61. A machine for punching structural shapes including in combination, punching means, devices for effecting a fixed relation between the work and a member having translational travel along the path of the work, and means rotatable to determine the amount of joint translational movement of the work and member.

62. A machine for punching structural shapes including in combination, punching means, devices for effecting a fixed relation between the work and a member having translational travel along the path of the work, means rotatable to determine the amount of joint translational movement of the work and member and settable devices automatically controlling said rotatable means.

63. A machine for punching structural shapes including in combination, punching mechanism, means for traveling and stopping a shape relative to said punching mechanism, said means comprising a guideway, a head traveling along said guideway and in fixed relation to the shape, a plurality of engaging devices along the path of the shape, an electrically operated device carried by said head and movable to selectively engage a desired one of said plurality of engaging devices, a set of electrical contacts automatically controlling the engagement of said engaging means, means for moving said devices together after they have engaged, to complete a distance setting and a distance record device controlling said contacts and said means for moving the shape together to determine the total travel of the beam.

64. A machine for punching structural shapes including in combination, punching mechanism, means for traveling and stopping a shape relative to said punching mechanism, said means comprising a head traveling in fixed relation to the shape, a plurality of engaging devices along the path of the shape, an electrically operated device carried by said head and movable to selectively engage a desired one of said plurality of engaging devices, a set of electrical contacts automatically controlling the engagement of said engaging means, means for moving said devices together after they have engaged, to complete a distance setting and a distance record device controlling said contacts and said means for moving the shape together to determine the total travel of the beam.

65. A machine for punching structural shapes including in combination, punching mechanism, means for traveling and stopping a shape relative to said punching mechanism, said means comprising a head traveling in fixed relation to the shape, a plurality of engaging devices along the path of the shape, an electrically operated device carried by said head and movable to selectively engage a desired one of said plurality of engaging devices, a set of electrical contacts automatically controlling the engagement of said engaging means, electrically operated means for moving said devices together after they have engaged, to complete a distance setting and a distance record device controlling said contacts and said means for moving the shape together to determine the total travel of the beam.

66. A machine for punching structural shapes including in combination, punching mechanism, means for traveling and stopping a shape relative to said punching mechanism, said means comprising a guideway, a head traveling along said guideway and engaged by the forward end of the shape, a plurality of engaging devices along the path of the shape, an electrically operated device carried by said head and movable to selectively engage a desired one of said plurality of engaging devices, a set of electrical contacts automatically controlling the engagement of said engaging means, and electrically operated rotary means for moving said devices together after they have engaged to complete a distance setting.

67. A machine for punching structural shapes including in combination, punching mechanism, means for traveling and stopping a shape relative to said punching mechanism, said means comprising a guideway, a head traveling along said guideway and engaged by the forward end of the shape, a plurality of engaging devices along the path of the shape, an electrically operated device carried by said head and movable to selectively engage a desired one of said plurality of engaging devices, a set of electrical contacts automatically controlling the engagement of said engaging means, and electrically operated rotary means for moving said devices together after they have engaged to complete a distance setting and a distance record sheet for controlling said contacts and said electrically controlled rotary means.

68. A machine for punching structural shapes including in combination punching mechanism, and means for traveling and stopping a shape relative to said punching mechanism including a bar extending along the path of travel of the shape and provided with spaced engaging members, an interponent traveling in fixed relation with the shape, and distance determining means for projecting the interponent to engage a selected engaging member on the bar.

69. A machine for punching structural shapes including in combination, punching mechanism, means for traveling and stopping a shape relative to said punching mechanism, including a bar extending along the path of travel of the shape and provided with spaced engaging members, an interponent traveling in fixed relation with the shape, distance determining means for projecting the interponent to engage a selected engaging member on the bar and means for imparting longitudinal movement to the bar after the engagement to complete the minor part of the distance setting.

70. A machine for punching structural shapes including in combination, punching mechanism, means for traveling and stopping a shape relative to said punching mechanism, including means engageable with the shape, a rotary member having screw-threaded engagement with said means to impart to the shape measured movement, and rotary means having a series of stop pins controlling said rotary member to measure the movement of the shape.

In testimony whereof, I have signed my name to this specification, in the presence of two subscribing witnesses.

GEORGE G. FRELINGHUYSEN.

Witnesses:
    CHARLES ASHMUN,
    ERNEST M. TAPNER.

Copies of this patent may be obtained for five cents each, by addressing the "Commissioner of Patents, Washington, D. C."